(12) United States Patent
Guo et al.

(10) Patent No.: US 11,165,885 B2
(45) Date of Patent: Nov. 2, 2021

(54) ROUTING METHOD AND DEVICE

(71) Applicant: ALIBABA GROUP HOLDING LIMITED, Grand Cayman (KY)

(72) Inventors: Dongbai Guo, Hangzhou (CN); Yanchao Li, Hangzhou (CN); Yu Chen, Hangzhou (CN); Zhi Sang, Hangzhou (CN); Tingming Zou, Hangzhou (CN); Kai Wen, Hangzhou (CN); Qianqian Wu, Hangzhou (CN); Zhiwei Zhou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 119 days.

(21) Appl. No.: 16/140,825

(22) Filed: Sep. 25, 2018

(65) Prior Publication Data

US 2019/0089812 A1 Mar. 21, 2019

Related U.S. Application Data

(63) Continuation of application No. PCT/CN2017/078046, filed on Mar. 24, 2017.

(30) Foreign Application Priority Data

Mar. 31, 2016 (CN) .......................... 201610197316.3

(51) Int. Cl.
*H04L 29/08* (2006.01)
*H04L 12/725* (2013.01)

(52) U.S. Cl.
CPC .......... *H04L 67/327* (2013.01); *H04L 45/308* (2013.01); *H04L 67/02* (2013.01);
(Continued)

(58) Field of Classification Search
CPC ..... H04L 67/327; H04L 67/02; H04L 45/308; H04L 67/22; H04L 67/142; H04L 67/306
See application file for complete search history.

(56) References Cited

U.S. PATENT DOCUMENTS

| 5,893,117 A | 4/1999 | Wang |
| 6,532,493 B1 | 3/2003 | Aviani, Jr. et al. |

(Continued)

FOREIGN PATENT DOCUMENTS

| CN | 101729591 A | 6/2010 |
| CN | 102497402 A | 6/2012 |

(Continued)

OTHER PUBLICATIONS

European Search Report for European Patent Application No. 17773160.1 dated Aug. 1, 2019 (7 pages).

(Continued)

*Primary Examiner* — Rupal Dharia
*Assistant Examiner* — Steven C Nguyen

(57) ABSTRACT

Embodiments of the present disclosure provide a routing method and device. The method includes: receiving an access request from a user, wherein the access request points to a page, obtaining user attribute information of the user based on the access request, determining, based on at least a part of the user attribute information and according to a preset rule, a server cluster, wherein the server cluster is configured to provide a service on the page for the user, and routing the access request to the server cluster.

11 Claims, 8 Drawing Sheets

(52) U.S. Cl.
CPC ............ *H04L 67/142* (2013.01); *H04L 67/22* (2013.01); *H04L 67/306* (2013.01)

(56) References Cited

U.S. PATENT DOCUMENTS

| | | | |
|---|---|---|---|
| 7,136,922 | B2 | 11/2006 | Sundaram et al. |
| 7,353,070 | B2 | 4/2008 | Landou et al. |
| 8,218,553 | B2 | 7/2012 | Kompella |
| 8,255,973 | B2 | 8/2012 | Hopen et al. |
| 8,259,585 | B1 | 9/2012 | Arun et al. |
| 8,271,967 | B2 | 9/2012 | Wu |
| 8,612,284 | B1 * | 12/2013 | Sharif ................... G06F 3/0611 705/7.35 |
| 8,612,862 | B2 | 12/2013 | Mascarenhas et al. |
| 8,843,160 | B2 | 9/2014 | Burckart et al. |
| 9,009,313 | B2 * | 4/2015 | Rice ................... G06Q 30/0601 709/225 |
| 9,020,887 | B2 | 4/2015 | Ngo et al. |
| 9,137,209 | B1 | 9/2015 | Brandwine et al. |
| 9,197,538 | B2 | 11/2015 | Hopen et al. |
| 2002/0131075 | A1 | 9/2002 | Kremer |
| 2002/0198937 | A1 | 12/2002 | Diwan et al. |
| 2003/0014539 | A1 | 1/2003 | Reznick |
| 2005/0105513 | A1 | 5/2005 | Sullivan et al. |
| 2006/0031394 | A1 | 2/2006 | Tazuma |
| 2006/0143703 | A1 | 6/2006 | Hopen et al. |
| 2008/0201413 | A1 * | 8/2008 | Sullivan ............ H04L 29/12066 709/203 |
| 2014/0032552 | A1 | 1/2014 | Cohen et al. |
| 2014/0067780 | A1 * | 3/2014 | Lipscomb .......... G06Q 30/0601 707/695 |
| 2014/0109123 | A1 | 4/2014 | Balakrishnan et al. |
| 2016/0087880 | A1 | 3/2016 | Shalita et al. |
| 2017/0187840 | A1 | 6/2017 | Zhu et al. |
| 2017/0230303 | A1 * | 8/2017 | Prince ................ G06Q 30/0241 |
| 2017/0317927 | A1 * | 11/2017 | Kadle ................... G06F 16/248 |
| 2018/0139273 | A1 * | 5/2018 | Liu ..................... H04L 67/1025 |
| 2018/0359311 | A1 * | 12/2018 | Paramasivam ......... H04L 67/42 |

FOREIGN PATENT DOCUMENTS

| | | |
|---|---|---|
| CN | 103685609 A | 3/2014 |
| CN | 103825975 A | 5/2014 |
| JP | 2003-216608 A | 7/2003 |
| JP | 2010-154569 A | 7/2010 |
| WO | 0131843 A2 | 5/2001 |
| WO | 2017/116932 A1 | 7/2017 |

OTHER PUBLICATIONS

International Preliminary Report on Patentability Chapter I for PCT Application No. PCT/CN2017/078046 dated Oct. 11, 2018 (11 pages).
First Office Action for Chinese Application No. 201610197316.3 dated Mar. 12, 2019 with English machine translation (9 pages).
First Search for Chinese Application No. 201610197316.3 dated Mar. 4, 2019 (1 page).
Office Action for Japanese Application No. 2018-551227 dated Sep. 17, 2019 (5 pages).
International Search Report and Written Opinion for Application No. PCT/CN2017/078046, dated May 27, 2017, 8 pages.
Supplementary Search dated Apr. 7, 2020, issued in related Chinese Application No. 201610197316.3 (1 page).

* cited by examiner

ROUTING METHOD AND DEVICE

CROSS REFERENCE TO RELATED APPLICATIONS

The present application is a continuation application of the International Patent Application No. PCT/CN2017/078046, filed on Mar. 24, 2017, and titled "Routing Method and Device," which claims priority to the Chinese Patent Application No. 201610197316.3 filed on Mar. 31, 2016." The entire contents of all of the above applications are incorporated herein by reference in their entirety.

TECHNICAL FIELD

The present invention relates to the field of communications technologies, and in particular, to a routing method and device.

BACKGROUND

User routing means that when a user accesses a website server, the server may redirect or forward as a proxy server the access of the user to another suitable server to process the user's request. With the development of the Internet, many companies begin attempting to rank users to implement different processing, so as to provide higher quality services for high-level users (such as paying members). Technically, different levels of users need to be routed to different servers or server clusters, to ensure that important resources are allocated to important users, so that functions for the high-level users are not affected as much as possible when there is a server resource bottleneck. In addition, Internet companies that provide world-wide user services usually face problems such as privacy/legal protection. For example, a country A requires that user data needs to be kept in the country or a politically neutral country, a country B requires that user data needs to be kept in several designated regions, and so on. In this case, different users need to be routed to server clusters in compliant regions.

In the existing technology, when different users access a same domain name, a domain name system (DNS) technology based on an IP address may be used to route the users to particular server clusters based on IP addresses of the users. The users are distinguished based on only the IP addresses, but the IP addresses of the users are usually inaccurate, and ranking of the users is usually very complex. Therefore, it is difficult to distinguish the users with fine distinctions based on only the IP addresses, and requirements such as distinguishing of user levels and privacy/legal protection cannot be met.

SUMMARY

To resolve problems in the existing technology, the present disclosure provides a routing method and device, to implement more fined user routing. According to a first aspect of embodiments of the present disclosure, a routing method is provided. The method includes: receiving an access request of a user, wherein the access request points to a particular webpage, obtaining user attribute information of the user based on the access request, determining, based on at least a part of the user attribute information and according to a preset rule, a server cluster corresponding to the user attribute information, wherein the server cluster is configured to provide service of the particular page for the user, and routing the access request to the server cluster. The particular page may include a page for which routing is to be performed or a page that is to provide a differentiated service.

In some embodiments, the obtaining user attribute information of the user based on the access request includes: obtaining a user identifier of the user based on the access request, and obtaining the user attribute information of the user based on the user identifier. The obtaining a user identifier of the user may include obtaining the user identifier from an HTTP uniform access layer. In another embodiment, the obtaining a user identifier of the user may include obtaining the user identifier of the user from login information of the user, wherein the user identifier is written into the login information when the user performs login.

In some embodiments, the user attribute information includes at least one of the following a level attribute of the user, a national attribute of the user, a country attribute of the user, a gender attribute of the user, an age attribute of the user, a geographical location attribute of the user, and historical behavior data of the user.

In some embodiments, the determining, based on at least a part of the user attribute information and according to a preset rule, a server cluster corresponding to the user attribute information includes querying a preset correspondence table of a user attribute and the server cluster based on the user attribute information, and determining the corresponding server cluster based on a query result; or performing calculation based on an attribute value in the user attribute information, and determining the corresponding server cluster based on a calculation result.

The performing calculation based on an attribute value in the user attribute information, and determining the corresponding server cluster based on a calculation result may include obtaining a weight of each user attribute, performing weight calculation based on the weight, and determining the corresponding server cluster based on a weight calculation result.

The routing the access request to the server cluster may include routing the access request to the server cluster through redirection. The routing the access request to the server cluster through redirection may include routing the access request to the server cluster through redirection using an HTTP status 302 or 301 when the access request is a stateless request, and routing the access request to the server cluster through redirection using an HTTP status 308 or 307 when the access request is a stateful request.

The server cluster may include one server or at least two servers. The server cluster is located in a country and/or a region designated by a country of the user. The server cluster provides a differentiated user service.

According to a second aspect of the embodiments of the present disclosure, a routing device is provided. The device includes: an access request receiving unit, configured to receive an access request of a user, where the access request points to a particular page, a user attribute information obtaining unit, configured to obtain user attribute information of the user based on the access request, a target server obtaining unit, configured to obtain, based on at least a part of the user attribute information and according to a preset rule, a server cluster corresponding to the user attribute information, where the server cluster is configured to provide a service on the particular page for the user, and an access request routing unit, configured to route the access request to the server cluster. The particular page includes a page for which routing is to be performed or a page that is to provide a differentiated service.

In some embodiments, the user attribute information obtaining unit includes: a user identifier obtaining subunit, configured to obtain a user identifier of the user based on the access request, and a user attribute information obtaining subunit, configured to obtain the user attribute information of the user based on the user identifier.

In some embodiments, the user identifier obtaining subunit is configured to obtain the user identifier from an HTTP uniform access layer. In some other embodiments, the user identifier obtaining subunit is configured to obtain the user identifier of the user from login information of the user, where the user identifier is written into the login information when the user performs login.

The user attribute information may include at least one of the following: a level attribute of the user, a national attribute of the user, a country attribute of the user, a gender attribute of the user, an age attribute of the user, a geographical location attribute of the user, and historical behavior data of the user.

In some embodiments, the target server obtaining unit includes a query subunit, configured to: query a preset correspondence table of a user attribute and a server based on the user attribute information, and obtain the corresponding server cluster based on a query result.

In some other embodiments, the target server obtaining unit includes a calculation subunit, configured to: perform calculation based on an attribute value in the user attribute information, and obtain the corresponding server cluster based on a calculation result. The calculation subunit may be configured to: obtain a weight of each user attribute, perform weight calculation based on the weight, and determine the corresponding server cluster based on a weight calculation result.

The access request routing unit may be configured to: route the access request to the server cluster through redirection. The access request routing unit may include a first jump subunit, configured to route the access request to the server cluster through redirection using an HTTP status 302 or 301 when the access request is a stateless request, and a second jump subunit, configured to route the access request to the server cluster through redirection using an HTTP status 308 or 307 when the access request is a stateful request.

The server cluster may include one server or at least two servers. The server cluster may be located in a country and/or a region designated by a country of the user. The server cluster may provide a differentiated user service.

The present disclosure further provides a routing device. According to some embodiments, the routing device includes one or more processors, and a memory storing instructions that, when executed by the one or more processors, cause the system to perform: receiving an access request from a user, wherein the access request points to a page, obtaining user attribute information of the user based on the access request, determining, based on at least a part of the user attribute information and according to a preset rule, a server cluster, wherein the server cluster is configured to provide a service on the page for the user, and routing the access request to the server cluster.

The present disclosure further provides a non-transitory computer-readable storage medium storing instructions that, when executed by a processor, cause the processor to perform a routing method. The method comprises receiving an access request from a user, wherein the access request points to a page, obtaining user attribute information of the user based on the access request, determining, based on at least a part of the user attribute information and according to a preset rule, a server cluster, wherein the server cluster is configured to provide a service on the page for the user, and routing the access request to the server cluster.

In the embodiments of the present disclosure, the user attribute information is first obtained, and a to-be-accessed server cluster is then determined based on the user attribute information. User routing can be finely distinguished by performing complex definition in and adding complex rule determining to the user attribute information. Therefore, according to the solutions of the present disclosure, user routing in various dimensions and having very abundant functions can be implemented. In addition, in a DNS technology, there is a plurality of DNS caches with relatively long convergence time that is usually in units of hours. Therefore, a real-time change cannot be implemented. However, in the embodiments of the present disclosure, the user attribute information and a determining rule can be modified at any time. In this way, user routing can be changed in real time. For example, upon payment by a non-paying user, a system can immediately route access of the user to a server cluster having a relatively high level of stability, so as to provide a higher quality service.

It will be appreciated that the above general description and the following detailed description are merely exemplary and explanatory, and do not limit the present invention.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION OF THE INVENTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
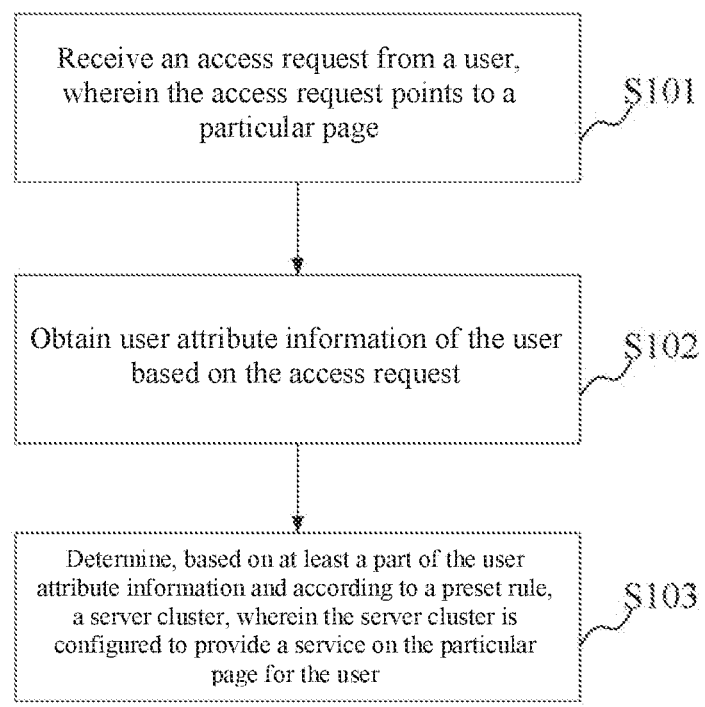
FIG. 1 is a flowchart of a routing method according to an exemplary embodiment.

FIG. 1 is a flowchart of a routing method according to an exemplary embodiment. The method may be applied to a network side device, for example, a server.

Referring to FIG. 1, the method may include steps S101 to S104.

Step S101. Receive an access request of a user, where the access request points to a particular page.

In an example, the particular page may be a page for which routing is to be performed or a page that is to provide a differentiated service, for example, a page on which different users show different content or a page with same content but different speeds/stability. When the user accesses the pages for which user routing needs to be performed, a network routes the user to a suitable server or a server cluster to implement access.

For example, a website has buyers throughout the world. How to prevent buyer privacy from being leaked and how to keep buyer information in only the country are problems that need to be resolved. In the embodiments of the present disclosure, users of different types/levels are routed, by using the user attribute information, to a server cluster displaying different content, to implement differentiation. In addition, a user may further be routed to a domestic server based on a country of the user, to implement privacy protection.

Step S102. Obtain user attribute information of the user based on the access request.

In an example, in some cases, the access request has carried attribute information of the user. For example, when the user sends the access request through a browser, the access request usually contains version information (for example, language version such as simplified Chinese, traditional Chinese, Japanese, and Korean) of the browser. A region in which the user is located can be deduced based on the information. Therefore, in this case, the attribute information of the user can be directly obtained from the access request.

Figure 2:
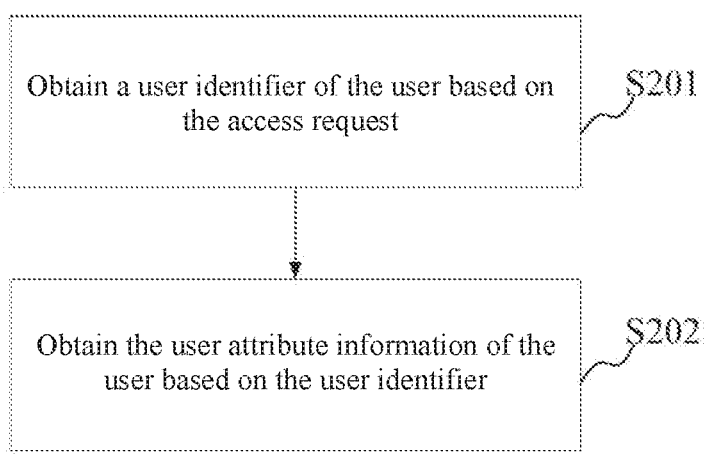
FIG. 2 is a flowchart of a routing method according to an exemplary embodiment.

In some other cases, referring to FIG. 2, in this embodiment or in some other embodiments of the present disclosure, the obtaining user attribute information of the user based on the access request may include:

Step S201. Obtain a user identifier of the user based on the access request.

A manner of obtaining the user identifier of the user is not limited in this embodiment. In this embodiment or in some other embodiments of the present disclosure, when the user identifier needs to be obtained, the user identifier of the user may be obtained from a cookie (login information) of the user. The user identifier is written into the cookie when the user performs login.

The user identifier may also be referred to as a user ID. For example, after the user performs login by using the user ID, the user ID may be written into the cookie in a uniform access layer. When the user ID needs to be obtained, the user ID may be obtained from the cookie.

The uniform access layer is an entry to each web page program or each group of web page programs. For the web page group, the access layer is software deployed for supporting the HTTP protocol and a server running on the access layer. For example, servers such as Nginx, Apache, Jetty, and Tomcat may be used as long as the servers support the HTTP protocol. For a large-scale website, all web page requests for providing services to the outside enter from a same access layer, that is, the uniform access layer. In other words, the obtaining a user identifier may include obtaining the user identifier from an HTTP uniform access layer.

For another perspective, the obtaining a user identifier of the user may include: obtaining the user identifier of the user from login information of the user, where the user identifier is written into the login information when the user performs login.

Step S202. Obtain the user attribute information of the user based on the user identifier. For example, the user attribute information may be a user profile (configuration file). The corresponding user profile may be found from a database or another medium based on the user ID.

Step S103. Obtain, based on at least a part of the user attribute information and according to a preset rule, a server cluster corresponding to the user attribute information, where the server cluster is configured to provide a service on the particular page for the user.

In an example, the server cluster may include one server or at least two servers. The server cluster may be located in a country and/or a region designated by a country of the user.

The server cluster may provide a differentiated user service. In addition to a differentiated web page, the differentiated service in the present disclosure may also refer to bandwidth improvement, security improvement, or the like.

Step S104. Route the access request to the server cluster.

For example, the information in the profile may be used as a rule for input, so as to calculate a cluster that the user needs to access, and redirect or forward as a proxy server a user request to a corresponding cluster based on different request types.

Specific content of the user attribute information is not limited in this embodiment, and technical personnel may customize the content according to a specific situation. All specific content that may be used herein does not depart from the spirit and the protection scope of the present disclosure.

In this embodiment or in some other embodiments of the present disclosure, the user attribute information includes at least one of the following:

a level attribute of the user, a national attribute of the user, a country attribute of the user, a gender attribute of the user, an age attribute of the user, a geographical location attribute of the user, and historical behavior data of the user.

An example may be shown in Table 1.

TABLE 1

| | Attribute name | Example of an attribute value |
|---|---|---|
| 1 | Level attribute of a user | High level, intermediary level, basic level; registered user, paying user; |
| 2 | National attribute of a user | The Han nationality, the Man nationality . . . |
| 3 | Country attribute of a user | China, America, the UK . . . |
| 4 | Gender attribute of a user | Male, female, unknown |
| 5 | Age attribute of a user | <20 years old, 21 to 30 years old, >31 years old |
| 6 | Geographical location attribute of a user | Beijing, Shanghai, Hainan; the north, the south; the eastern, the western, the middle . . . |
| 7 | Historical behavior data of a user | A quantity of login times, a quantity of shopping times, last shopping time, annual consumption sum, a quantity of returns and exchanges . . . |

Figure 3:
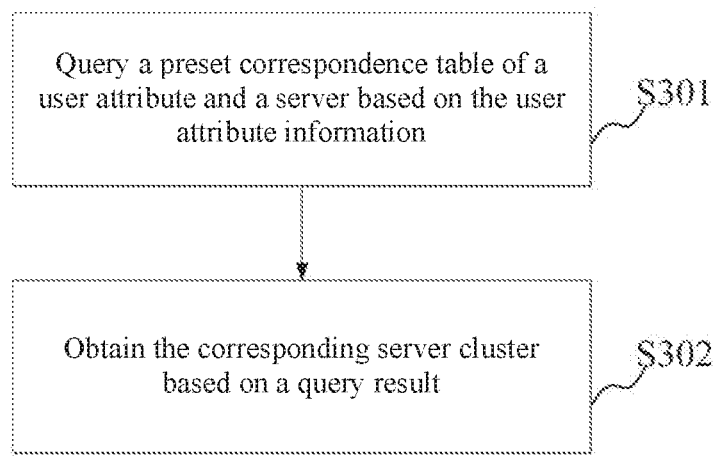
FIG. 3 is a flowchart of a routing method according to an exemplary embodiment.
Figure 4:
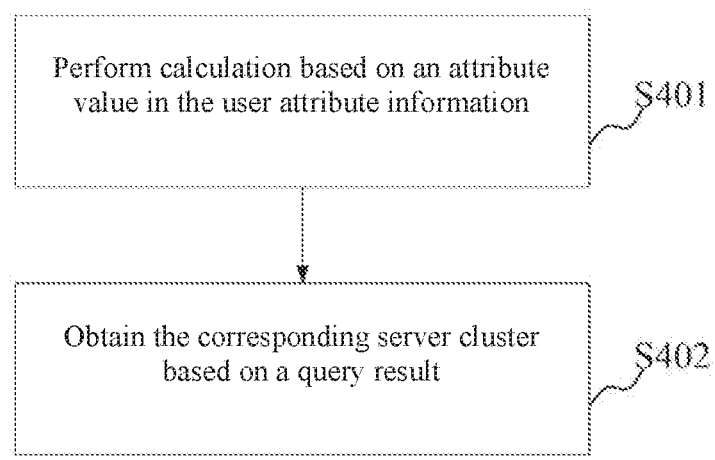
FIG. 4 is a flowchart of a routing method according to an exemplary embodiment.

Referring to FIG. 3 and FIG. 4, in this embodiment or in some other embodiments of the present disclosure, the determining, based on at least a part of the user attribute information and according to a preset rule, a server cluster corresponding to the user attribute information may include the following steps.

Step S301. Query a preset correspondence table of a user attribute and the server cluster based on the user attribute information.

In an example, a correspondence table of the country attribute of the user and a server may be preset, and a server or a server cluster to which a user in a country should be routed is determined by querying the table.

Step S302. Obtain the corresponding server cluster based on a query result.

Alternatively, the following steps may be included:

Step S401. Perform calculation based on an attribute value in the user attribute information.

In an example, a particular weight may be assigned to each user, then weight calculation is performed, and a server or a server cluster to which the user should be routed is determined based on comparison between a scoring result of the weight calculation and a threshold.

Step S402. Determining the corresponding server cluster based on a calculation result.

Figure 5:
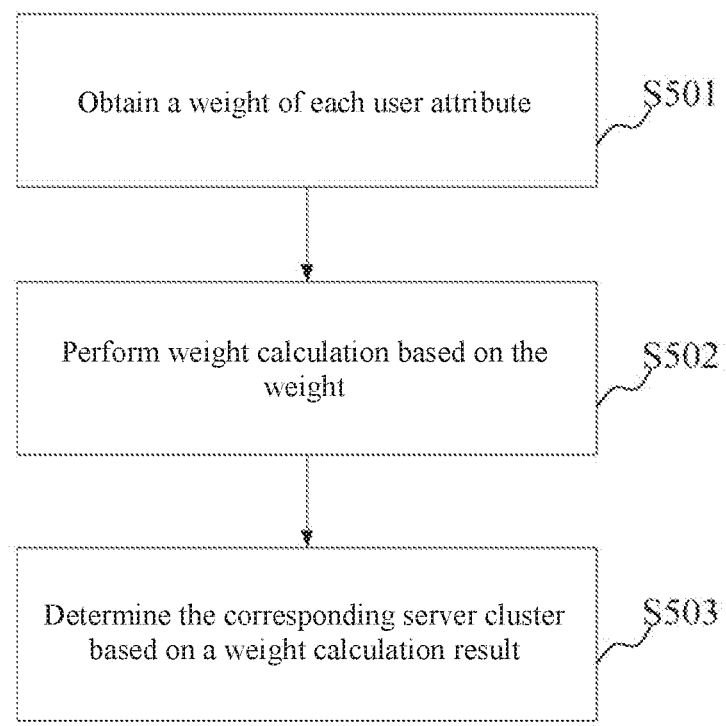
FIG. 5 is a flowchart of a routing method according to an exemplary embodiment.

In an example, referring to FIG. 5, the performing calculation based on an attribute value in the user attribute information, and determining the corresponding server cluster based on a calculation result may include the following steps.

Step S501. Obtain a weight of each user attribute.

Step S502. Perform weight calculation based on the weight.

Step S503. Determine the corresponding server cluster based on a weight calculation result.

In this embodiment or in some other embodiments of the present disclosure, the routing the access request to the server cluster may include routing the access request to the server cluster through redirection. In an example, the routing the access request to the server cluster through redirection may include: routing the access request to the server cluster through redirection using an HTTP status 302 or 301 when the access request is a stateless request, and routing the access request to the server cluster through redirection using an HTTP status 308 or 307 when the access request is a stateful request.

The HTTP status code 301 represents permanent movement, and means that a requested resource has permanently moved to a new location. The status code 302 represents temporary movement, and means that the server currently responds to a request by using web pages at different locations, but a requester should use its original location for responding to subsequent requests. The status code 307 represents temporary redirection, and means that a currently requested resource should be resent from another address, but a future request should still use an original address. The status code 308 represents permanent movement, and means that a requested resource is permanently located on another address, that is, that both a current request and a future request should be resent from the another address.

During implementation, specifically, after the server cluster of the user is calculated according to a rule, for different types of requests, there may be different processing methods. For example, when a user request is a stateless request, such as a GET request, to reduce dependence between servers, the browser may jump to the corresponding server cluster by using 302 or 301. If a user request is a stateful request, such as a POST request or a PUT request, to reduce scheduling between servers, the browser may jump to the corresponding server cluster by using 308 or 307. In this case, data submitted in a form by the user is carried during the jump, so that functions for the user are not affected.

In this embodiment, the user attribute information is first obtained, and a to-be-accessed server cluster is then determined based on the user attribute information. User routing can be finely distinguished by implementing complex definition in and adding complex rule determination to the user attribute information. Therefore, according to the solution of the present disclosure, user routing in various dimensions and having very abundant functions can be implemented. In addition, in DNS technology, there is a plurality of DNS caches with relatively long convergence time that is usually in units of hours. Therefore, a real-time change cannot be implemented. However, in the embodiments of the present disclosure, the user attribute information and a determining rule can be modified at any time. In this way, user routing can be changed in real time. For example, upon payment by a non-paying user, a system can immediately route access of the user to a server cluster having a relatively high level of stability, so as to provide a higher quality service.

The following further describes the solutions of the present disclosure with reference to specific scenarios.

Figure 6:
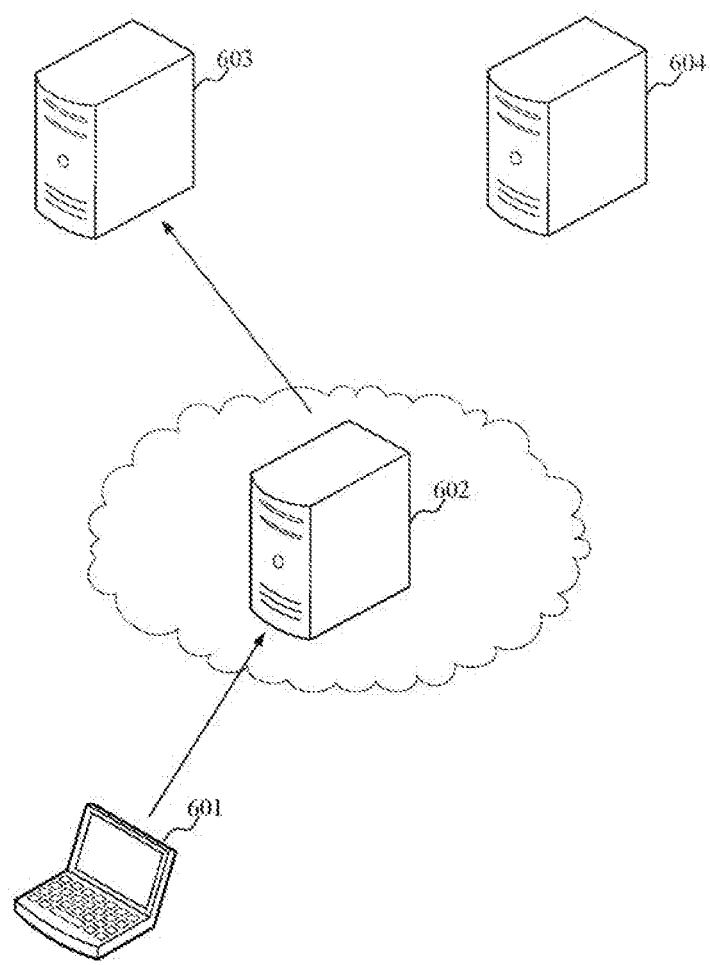
FIG. 6 is a schematic diagram of a routing scenario according to an exemplary embodiment.

In a scenario shown in FIG. 6, a non-paying user accesses, by using a terminal device 601 (for example, a notebook computer), a page for which user routing needs to be performed, and a server 602 routes the access to a server 603 based on a user ID, to complete access.

Figure 7:
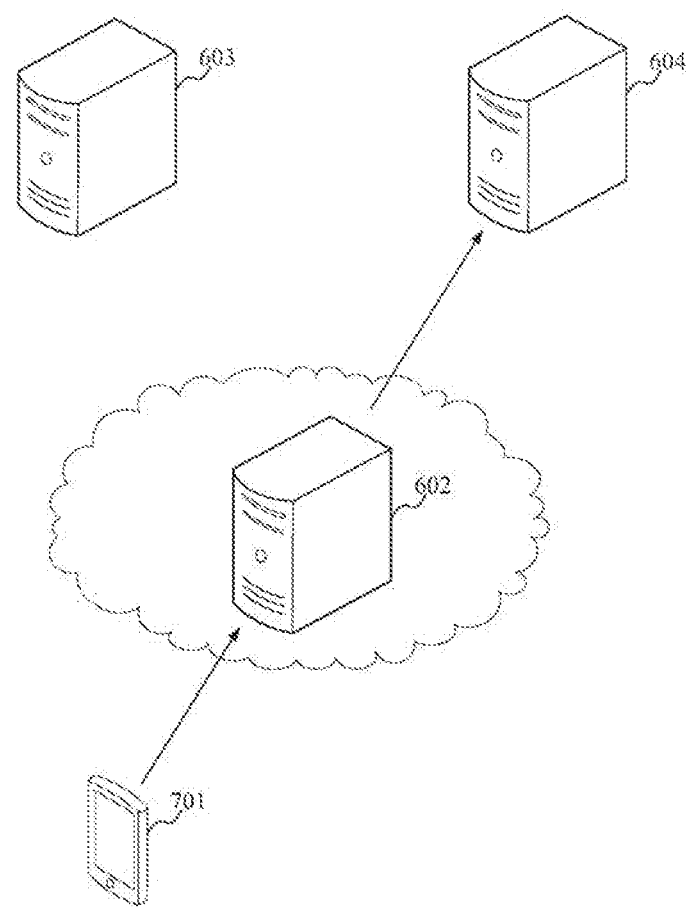
FIG. 7 is a schematic diagram of a routing scenario according to an exemplary embodiment.

In a scenario shown in FIG. 7, a paying user accesses, by using a terminal device 701 (for example, a mobile phone), the same page for which user routing needs to be performed, and the server 602 routes the access to a server 604 based on a user ID, to complete access.

Figure 8:
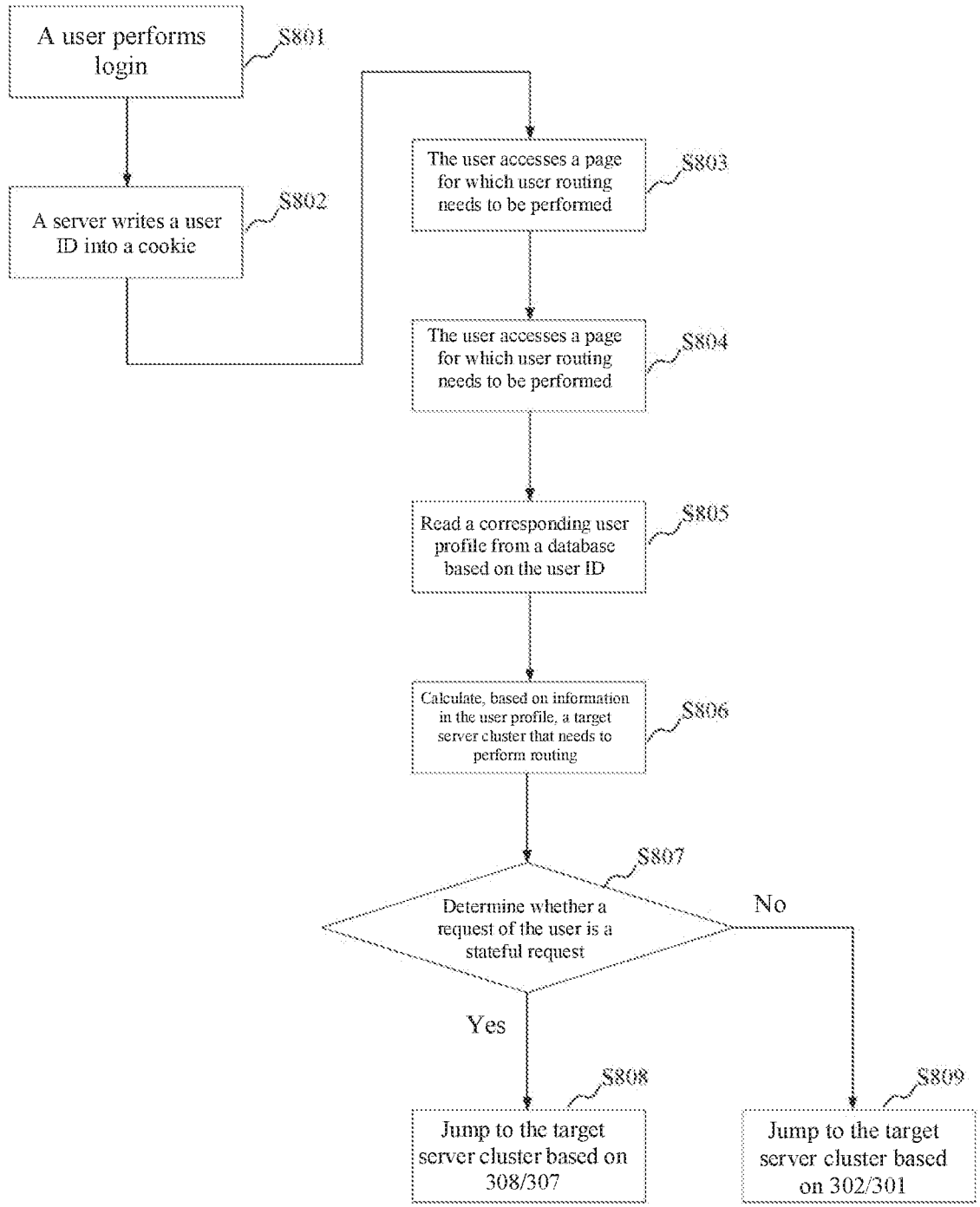
FIG. 8 is a flowchart of a routing method according to an exemplary embodiment.

For a related process, further refer to FIG. 8, and the process includes the following steps.

Step S801. A user performs login.

Step S802. A server writes a user ID into a cookie.

Step S803. The user accesses a page for which user routing needs to be performed.

Step S804. The server obtains the user ID based on the cookie.

Step S805. Read a corresponding user profile from a database based on the user ID.

Step S806. Calculate, based on information in the user profile, a target server cluster that needs to perform routing.

Step S807. Determine whether a request of the user is a stateful request. If the request is a stateful request, perform step S808. If the request is a stateless request, perform step S809.

Step S808. Jump to the target server cluster based on 308/307. The procedure ends.

Step S809. Jump to the target server cluster based on 302/301. The procedure ends.

In this embodiment, the user attribute information is first obtained by using the user identifier, and a to-be-accessed server or server cluster is then determined based on the user attribute information. User routing can be finely distinguished by implementing complex definition in and adding complex rule determination to the user attribute information. Therefore, according to the solution of the present disclosure, user routing in various dimensions and having very abundant functions can be implemented. In addition, in DNS technology, there is a plurality of DNS caches with relatively long convergence time that is usually in units of hours. Therefore, a real-time change cannot be implemented. However, in the embodiments of the present disclosure, the user attribute information and determination rules can be modified at any time. In this way, user routing can be changed in real time. For example, upon payment by a non-paying user, a system can immediately route access of the user to a server cluster having a relatively high level of stability, so as to provide a higher quality service.

The following are device embodiments of the present disclosure that may be used to perform the method embodiments of the present disclosure. For details not disclosed in the device embodiments of the present disclosure, refer to the method embodiments of the present disclosure.

Figure 9:
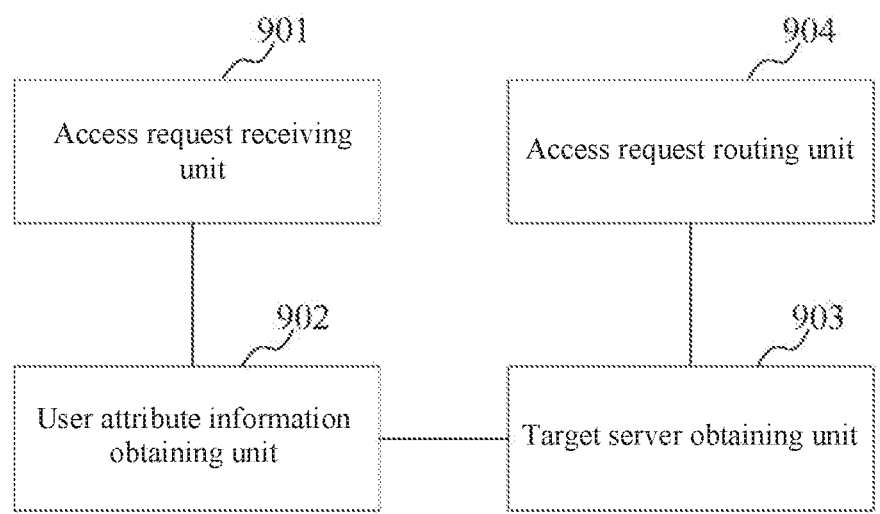
FIG. 9 is a block diagram of a routing device according to an exemplary embodiment.

FIG. 9 is a block diagram of a routing device according to an exemplary embodiment. The device may be applied to a network side device, for example, a server.

Referring to FIG. 9, the device may include:

an access request receiving unit 901, configured to receive an access request of a user, where the access request points to a particular page;

a user attribute information obtaining unit 902, configured to obtain user attribute information of the user based on the access request;

a target server obtaining unit 903, configured to obtain, based on at least a part of the user attribute information and according to a preset rule, a server cluster corresponding to the user attribute information, where the server cluster is configured to provide a service on the particular page for the user; and an access request routing unit 904, configured to route the access request to the server cluster.

In an example, the server cluster may include one server or at least two servers. The server cluster may be located in a country and/or a region designated by a country of the user.

The server cluster may provide a differentiated user service. In addition to a differentiated web page, the differentiated service in the present disclosure may also refer to bandwidth improvement, security improvement, or the like.

In this embodiment or in some other embodiments of the present disclosure, the particular page includes a page for which routing is to be performed or a page that is to provide a differentiated service.

Figure 10:
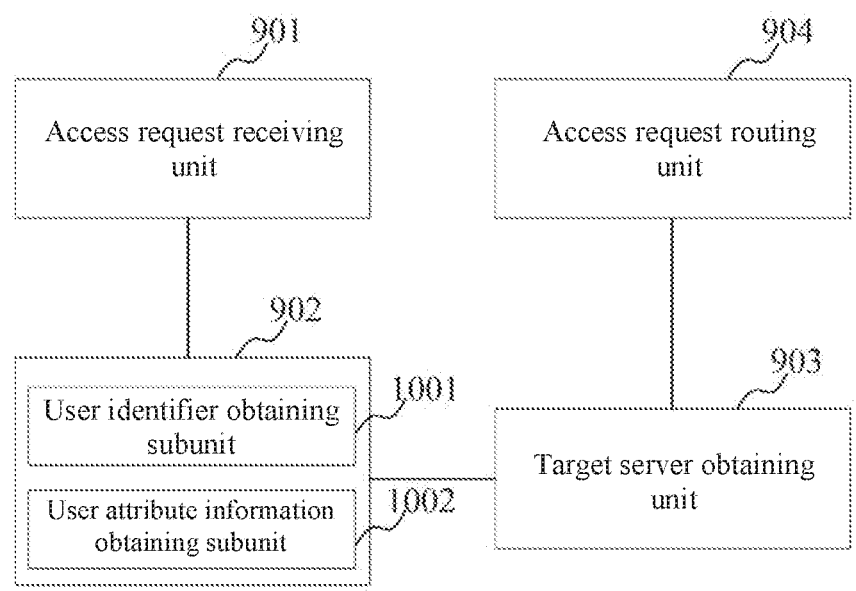
FIG. 10 is a block diagram of a routing device according to an exemplary embodiment.

Referring to FIG. 10, in this embodiment or in some other embodiments of the present disclosure, the user attribute information obtaining unit includes:

a user identifier obtaining subunit 1001, configured to obtain a user identifier of the user based on the access request; and a user attribute information obtaining subunit 1002, configured to obtain the user attribute information of the user based on the user identifier.

In this embodiment or in some other embodiments of the present disclosure, the user identifier obtaining subunit is configured to: obtain the user identifier from an HTTP uniform access layer.

In this embodiment or in some other embodiments of the present disclosure, the user identifier obtaining subunit is configured to: obtain the user identifier of the user from login information of the user, where the user identifier is written into the login information when the user performs login.

In this embodiment or in some other embodiments of the present disclosure, the user attribute information may include at least one of the following: a level attribute of the user, a national attribute of the user, a country attribute of the user, a gender attribute of the user, an age attribute of the user, a geographical location attribute of the user, and historical behavior data of the user.

In this embodiment or in some other embodiments of the present disclosure, the target server obtaining unit may include: a query subunit, configured to: query a preset correspondence table of a user attribute and a server based on the user attribute information, and obtain the corresponding server cluster based on a query result;

In this embodiment or in some other embodiments of the present disclosure, the target server obtaining unit may include: a calculation subunit, configured to: perform calculation based on an attribute value in the user attribute information, and obtain the corresponding server cluster based on a calculation result.

In an example, the calculation subunit is configured to: obtain a weight of each user attribute, perform weight calculation based on the weights, and determine the corresponding server cluster based on a weight calculation result.

In this embodiment or in some other embodiments of the present disclosure, the access request routing unit may be configured to: route the access request to the server cluster through redirection.

Figure 11:
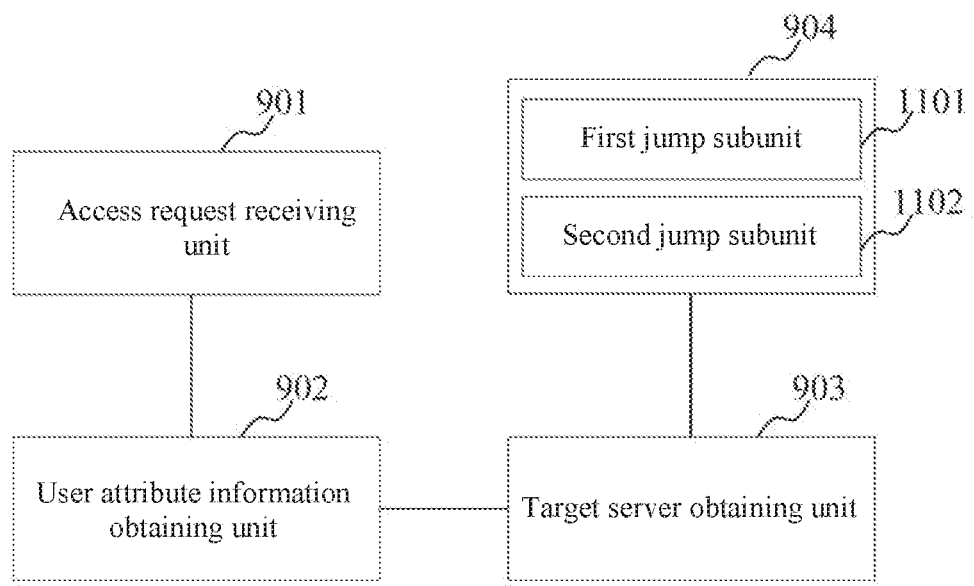
FIG. 11 is a block diagram of a routing device according to an exemplary embodiment.

In an example, referring to FIG. 11, the access request routing unit may include: a first jump subunit 1101, configured to route the access request to the server cluster through redirection using an HTTP status 302 or 301 when the access request is a stateless request; and a second jump subunit 1102, configured to route the access request to the server cluster through redirection using an HTTP status 308 or 307 when the access request is a stateful request.

In this embodiment, the user attribute information is first obtained, and a to-be-accessed server cluster is then determined based on the user attribute information. User routing can be finely distinguished by performing complex definition in and adding complex rule determining to the user attribute information. Therefore, according to the embodiments of the present disclosure, user routing in various dimensions and having very abundant functions can be implemented. In addition, in DNS technology, there is a plurality of DNS caches with relatively long convergence time that is usually in units of hours. Therefore, a real-time change cannot be implemented. However, in the embodiments of the present disclosure, the user attribute information and determination rules can be modified at any time. In this way, user routing can be changed in real time. For example, upon payment by a non-paying user, a system can immediately route access of the user to a server cluster having a relatively high level of stability, so as to provide a higher quality service.

Specific methods used by various units of the device in the above embodiment to perform operations have been described in detail in the related method embodiments, and will not be elaborated here.

Other embodiments of the present disclosure will be apparent to those skilled in the art from consideration of the specification and practice of the present invention disclosed here. This application is intended to cover any variations, uses, or adaptations of the present invention following the general principles thereof and including such departures from the present disclosure as come within known or customary practice in the art. It is intended that the specification and examples be considered as exemplary only, with a true scope and spirit of the present invention being indicated by the following claims.

A person skilled in the art can also understand that the various illustrative logic blocks, elements, and steps listed in the embodiments of this disclosure may be achieved through hardware, software, or a combination of the two. A person skilled in the art can use various methods for specific applications to achieve these functions, but these implementations should not be understood as exceeding the scope of protection of the embodiments of this disclosure.

All of the various illustrative logical blocks or elements described in the embodiments of this disclosure can achieve or operate the described functions using a general processor, digital signal processor, application specific integrated circuit (ASIC), field programmable gate array, or other programmable logic apparatus, discrete gate or transistor logic, discrete hardware unit, or any combination of the above. A general processor can be a microprocessor, or it can be any traditional processor, controller, microcontroller, or state machine. Optionally, a processor can also be achieved through a combination of computation apparatuses, e.g., a digital signal processor and microprocessor, multiple microprocessors, one or more microprocessors joined with a digital signal processor core, or any other similar configuration.

The steps of the methods or algorithms described in the embodiments of this disclosure can be directly embedded into software modules executed by hardware or processors, or a combination of the two. The software modules can be stored in non-transitory computer-readable storage medium, such as RAM memory, flash memory, ROM memory, EPROM memory, EEPROM memory, registers, hard drives, removable discs, CD-ROM, or a storage medium of any format in this field. As an example, the storage medium can be linked to a processor, making it possible for the processor to read information from the storage medium and write information into the storage medium. Optionally, the storage medium can be integrated into the processor. The processor and storage medium can be installed in a computing device, such as a routing device or a server.

It will be appreciated that the present invention is not limited to the exact construction that has been described above and illustrated in the accompanying drawings, and that various modifications and changes can be made without departing from the scope thereof. It is intended that the scope of the present invention only be limited by the appended claims.

What is claimed is:

1. A routing method, wherein the method comprises:
   receiving an access request from a user, wherein the access request points to a page;
   obtaining a user identifier of the user based on the access request;
   obtaining user attribute information of the user and a preset rule based on the access request and the user identifier;
   obtaining a weight of each user attribute of the user attribute information;
   performing a weight calculation based on at least one attribute value in the user attribute information and at least one weight corresponding to the at least one attribute value to obtain a weight calculation result;
   determining, based on the weight calculation result and according to the preset rule, a server cluster, wherein the server cluster is configured to provide a differentiated user service on the page for the user, wherein the differentiated user service comprises one or more of the following for different users: different speeds and different stabilities;
   determining whether the access request to the server cluster is a stateless request or stateful request; and
   routing the access request to the server cluster based on the differentiated user service and according to the determination whether the access request to the server cluster is a stateless request or stateful request, by:
   routing the access request to the server cluster through redirection using an HTTP status 302 or 301 when the determined access request is a stateless request; and
   routing the access request to the server cluster through redirection using an HTTP status 308 or 307 when the determined access request is a stateful request, the routing comprising carrying data submitted in a form by the user so that functions for the user are not affected.

2. The method according to claim 1, wherein the obtaining a user identifier of the user comprises:
   obtaining the user identifier from an HTTP uniform access layer.

3. The method according to claim 1, wherein the obtaining a user identifier of the user comprises:
   obtaining the user identifier of the user from login information of the user.

4. The method according to claim 1, wherein the user attribute information comprises at least one of the following:
   a level attribute of the user, a national attribute of the user, a country attribute of the user, a geographical location attribute of the user, and historical behavior data of the user.

5. The method according to claim 1, wherein the determining, based on the calculation result and according to a preset rule, a server cluster comprises:
   querying a preset correspondence table of a user attribute and the server cluster based on the user attribute information; and
   determining the server cluster based on a query result and the calculation result.

6. The method according to claim 1, wherein the differentiated user service is determined based on a level attribute of the user, wherein the level attribute of the user comprises at least one of a high level, an intermediary level, a basic level, a registered user, an unregistered user, a paying user, or a non-paying user.

7. The method according to claim 1, wherein the server cluster is located in a country and/or a region designated by a country of the user.

8. A routing device, wherein the device comprises:
   one or more processors; and
   a memory storing instructions that, when executed by the one or more processors, cause the system to perform:
   receiving an access request from a user, wherein the access request points to a page;
   obtaining a user identifier of the user based on the access request;
   obtaining user attribute information of the user and a preset rule based on the access request and the user identifier;
   obtaining a weight of each user attribute of the user attribute information;
   performing a weight calculation based on at least one attribute value in the user attribute information and at least one weight corresponding to the at least one attribute value to obtain a weight calculation result;
   determining, based on the weight calculation result and according to the preset rule, a server cluster, wherein the server cluster is configured to provide a differentiated user service on the page for the user, wherein the differentiated user service comprises one or more of the following for different users: different speeds and different stabilities;
   determining whether the access request to the server cluster is a stateless request or stateful request; and routing the access request to the server cluster based on the differentiated user service and according to the determination whether the access request to the server cluster is a stateless request or stateful request, by:
  routing the access request to the server cluster through redirection using an HTTP status 302 or 301 when the determined access request is a stateless request; and
  routing the access request to the server cluster through redirection using an HTTP status 308 or 307 when the determined access request is a stateful request, the routing comprising carrying data submitted in a form by the user so that functions for the user are not affected.

9. The routing device according to claim 8, wherein the determining, based on the calculation result and according to a preset rule, a server cluster comprises:
  querying a preset correspondence table of a user attribute and the server cluster based on the user attribute information; and
  determining the server cluster based on a query result and the calculation result.

10. A non-transitory computer-readable storage medium storing instructions that, when executed by a processor, cause the processor to perform a routing method, the method comprising:
  receiving an access request from a user, wherein the access request points to a page;
  obtaining a user identifier of the user based on the access request;
  obtaining user attribute information of the user and a preset rule based on the access request and the user identifier;
  obtaining a weight of each user attribute of the user attribute information;
  performing a weight calculation based on at least one attribute value in the user attribute information and at least one weight corresponding to the at least one attribute value to obtain a weight calculation result;
  determining, based on the weight calculation result and according to the preset rule, a server cluster, wherein the server cluster is configured to provide a differentiated user service on the page for the user, wherein the differentiated user service comprises one or more of the following for different users: different speeds and different stabilities;
  determining whether the access request to the server cluster is a stateless request or stateful request; and
  routing the access request to the server cluster based on the differentiated user service and according to the determination whether the access request to the server cluster is a stateless request or stateful request, by:
    routing the access request to the server cluster through redirection using an HTTP status 302 or 301 when the determined access request is a stateless request; and
    routing the access request to the server cluster through redirection using an HTTP status 308 or 307 when the determined access request is a stateful request, the routing comprising carrying data submitted in a form by the user so that functions for the user are not affected.

11. The non-transitory computer-readable storage medium according to claim 10, wherein:
  the differentiated user service is determined based on a level attribute of the user, wherein the level attribute of the user comprises at least one of a high level, an intermediary level, a basic level, a registered user, an unregistered user, a paying user, or a non-paying user.

* * * * *